United States Patent [19]
Izumida et al.

[11] Patent Number: 5,676,896
[45] Date of Patent: Oct. 14, 1997

[54] PROCESS FOR THE PRODUCTION OF MOLDED ARTICLE WITH SEALED PATTERN

[75] Inventors: Toshiaki Izumida; Kazuyuki Akahori; Katsumi Yoshida; Hisashi Tahara, all of Hiratsuka, Japan

[73] Assignee: Mitsubishi Gas Chemical Company, Inc., Tokyo, Japan

[21] Appl. No.: 704,258

[22] Filed: Aug. 28, 1996

Related U.S. Application Data

[63] Continuation of Ser. No. 228,855, Apr. 18, 1994, abandoned.

[30] Foreign Application Priority Data

Sep. 20, 1993 [JP] Japan ................ 5-233458
Mar. 28, 1994 [JP] Japan ................ 6-057465

[51] Int. Cl.$^6$ ................ B29C 45/14; B29C 45/04
[52] U.S. Cl. ................ 264/132; 264/135; 264/261; 264/293; 264/328.7; 425/127
[58] Field of Search ................ 264/259, 132, 264/261, 328.7, 266, 294, 293, 134, 135; 425/127, 128, 129.1

[56] References Cited

U.S. PATENT DOCUMENTS

| 206,536 | 7/1878 | Carter | 425/130 |
|---|---|---|---|
| T904,007 | 11/1972 | Garner | 425/130 |
| 2,226,408 | 12/1940 | Nast | 425/130 |
| 2,279,208 | 4/1942 | Shaw | 425/130 |
| 3,339,240 | 9/1967 | Corbett | 425/130 |
| 3,632,729 | 1/1972 | Bielfeldt | 264/328.7 |
| 4,489,033 | 12/1984 | Uda et al. | 264/328.7 |
| 4,770,836 | 9/1988 | Velter et al. | 264/261 |

FOREIGN PATENT DOCUMENTS

| 59-185636 | 10/1984 | Japan | 264/328.7 |
|---|---|---|---|
| 60-250927 | 12/1985 | Japan | |
| 60-253518 | 12/1985 | Japan | |
| 60-253519 | 12/1985 | Japan | |
| 61-5910 | 1/1986 | Japan | |
| 61-120741 | 6/1986 | Japan | |
| 1-95019 | 4/1989 | Japan | |
| 1-99822 | 4/1989 | Japan | |
| 4-128022 | 4/1992 | Japan | 264/328.7 |

OTHER PUBLICATIONS

Jobst Harreis "Injection Stamping—A Special Process for the Production of Large Injection Molded Articles" SPE Journal. vol. 24, Apr., 1968, pp. 61–63.

*Primary Examiner*—Angela Ortiz
*Attorney, Agent, or Firm*—Wenderoth, Lind & Ponack

[57] ABSTRACT

A process for the production of a molded article having a surface including a sealed pattern by an injection compression molding method, which comprises placing a substrate (thickness: X (mm)) having a pattern on the front surface thereof in a cavity of a mold with the reverse surface of the substrate in contact with a cavity wall of the mold, injecting a molten thermoplastic resin into a space surrounded by cavity walls and the front surface of the substrate, and thereby forming a resin layer (thickness: Y (mm)) on the front surface of the substrate to form a molded article having the pattern sealed with the resin layer and having a thickness of 1 to 6 mm (=X+Y (mm)), wherein:
a distance (Z+Y (mm)) of the space in the molded article thickness direction is set to satisfy the following relationships when the substrate is placed in the cavity of the mold, when Y is in the range of $0.3 \leq Y < 0.5$ mm, $\{7.5-10Y\}(mm) \leq Z \leq 5.0$ (mm); when Y is in the range of $0.5 \leq Y < 2.0$ mm, $\{3.0-Y\}(mm) \leq Z \leq 5.0$ (mm); when Y is in the range of $2.0 \leq Y < 3.0$ mm, $\{2.0-Y/2\}(mm) \leq Z \leq 5.0$ (mm); and when Y is in the range of $3.0 \leq Y \leq 5.9$ mm, $\{1.0-Y/6\}(mm) \leq Z \leq 5.0$ (mm), and the distance (Z+Y (mm)) of the space in the molded article thickness direction is decreased to Y (mm) while or as soon as the molten thermoplastic resin is injected into the space having the distance (Z+Y (mm)) in the molded article thickness direction.

14 Claims, 6 Drawing Sheets

MOLD A

MOLD B

PROCESS FOR THE PRODUCTION OF MOLDED ARTICLE WITH SEALED PATTERN

This application is a Continuation of now abandoned application Ser. No. 08/228,855, filed Apr. 18, 1994, now abandoned.

BACKGROUND OF THE INVENTION AND RELATED ART

The present invention relates to a process for the production of a molded article with a pattern formed on the front surface of the article and sealed with a resin layer, i.e., a molded article formed of a thermoplastic resin in the form of a film or a sheet and provided with a pattern which is formed on its front surface and is sealed with a resin layer (to be sometimes simply referred to as "molded article with a sealed pattern" hereinafter), by an injection compression molding method. The term "pattern" also includes characters, letters, marks, symbols, and the like.

Various methods for producing a molded article with a sealed pattern are known. For example, JP-A-61-120741 discloses a method in which a thermoplastic film or sheet (to be sometimes referred to as a "film substrate" hereinafter) having a pattern on its front surface is placed in the cavity of a mold with its reverse surface in contact with the cavity wall and a molten thermoplastic resin is injected into the gap surrounded by the cavity wall and the front surface of the film substrate to form a resin layer on the front surface of the film substrate. When the molten thermoplastic resin is injected, the pattern formed on the film substrate surface near the gate portion of the mold is sometimes damaged under the influence of shear stress of the molten thermoplastic resin. For preventing the damage to the pattern, the above method requires the pattern formed on the surface to be spaced at least 1 cm from the gate portion of the mold. Therefore, the above method has a problem in that the design of the molded article or the design of the mold is limited. The damage to the pattern is specifically recognized, for example, as the following phenomenon. The pattern is deformed or lost due to displacement of a printing ink forming the pattern on the surface of the film substrate.

JP-A-1-95019 discloses one method as a solution for the problem of the method of the above JP-A-61-120741. In the method disclosed in JP-A-1-95019, a film or sheet of a transparent resin (to be sometimes simply referred to as a "film of a transparent resin") is laminated on that surface of a film or sheet substrate (to be sometimes referred to as a "sheet substrate" hereinafter) on which a pattern is formed, or a transparent resin is coated on the above surface of the sheet substrate, and then a thermoplastic resin is injected to form a resin layer on the film of a transparent resin or on the coating of the transparent resin. The above film of a transparent resin or the coating of a transparent resin formed on the sheet substrate inhibits the influence of shear stress of the molten thermoplastic resin on that portion of the sheet substrate which is near the gate portion of the mold, and as a result, the damage to the pattern formed on the sheet substrate surface can be prevented. However, the above method requires an additional step for laminating the film of a transparent resin or coating the transparent resin on the sheet substrate as described above, and accordingly requires an additional cost.

Further, the following method is also known for preventing the damage to the pattern on that portion of a film or sheet substrate which is near the gate portion of a mold. That is, a thermosetting resin is used as an ink for forming a pattern, and a film or sheet substrate having a glass transition temperature of 100° C. or higher is used, whereby the temperature for baking the ink can be set at 100° C. or higher. In this case, however, it is very difficult to obtain a general ink or a general film or sheet substrate which can be suitably used under the above conditions, and the above method is hence not practical.

OBJECT AND SUMMARY OF THE INVENTION

It is therefore an object of the present invention to provide a process for the production of a molded article with a sealed pattern, which requires no special treatment of the front surface of a substrate of a thermoplastic resin in the form of a film or a sheet having a pattern formed thereon, and which is free from causing any damage on the pattern when a resin layer is formed on the front surface of the substrate to seal the pattern.

For achieving the above object and advantages of the present invention, the first aspect of the present invention is directed to a process for the production of a molded article having a surface including a sealed pattern by an injection compression molding method, which comprises placing a substrate (thickness: X (mm)) comprising a thermoplastic resin material in the form of a film or a sheet and having a pattern on the front surface thereof in a cavity of a mold with the reverse surface of the substrate in contact with cavity walls of the mold, injecting a molten thermoplastic resin into a space surrounded by cavity walls and the front surface of the substrate, and thereby forming a resin layer (thickness: Y (mm)) of the thermoplastic resin on the front surface of the substrate to form a molded article having the pattern sealed with the resin layer and having a thickness of 1 to 6 mm (=X+Y (mm)), wherein:

a distance (Z+Y (mm)) of the space in the molded article thickness direction is set to satisfy the following relationships when the substrate is placed in the cavity of the mold, when Y is in the range of $0.3 \leq Y < 0.5$ mm, $\{7.5-10Y\}$ (mm)$\leq Z \leq 5.0$ (mm), when Y is in the range of $0.5 \leq Y < 2.0$ mm, $\{3.0-Y\}$ (mm)$\leq Z \leq 5.0$ (mm), when Y is in the range of $2.0 \leq Y < 3.0$ mm, $\{2.0-Y/2\}$ (mm)$\leq Z \leq 5.0$ (mm), and when Y is in the range of $3.0 \leq Y \leq 5.9$ mm, $\{1.0-Y/6\}$ (mm)$\leq Z \leq 5.0$ (mm), and the distance (Z+Y (mm)) of the space in the molded article thickness direction is decreased to Y (mm) while or as soon as the molten thermoplastic resin is injected into the space having the distance (Z+Y (mm)) in the molded article thickness direction.

For achieving the above object and advantages of the present invention, the second aspect of the present invention is directed to a process for the production of a molded article having a surface including a sealed pattern by an injection compression molding method, which comprises placing a first substrate (thickness: $X_1$ (mm)) comprising a thermoplastic resin material in the form of a film or a sheet and having a pattern on the front surface thereof and a second substrate (thickness: $X_2$ (mm)) in a cavity of a mold so that the reverse surface of each substrate is in contact with a cavity wall of the mold and that each front surface of these two substrates is opposed to each other, injecting a molten thermoplastic resin into a space surrounded by cavity walls and the front surfaces of the substrates, and thereby forming a resin layer (thickness: Y (mm)) of the thermoplastic resin in a gap between the front surface of the first substrate and the front surface of the second substrate to form a molded article having the pattern sealed with the resin layer and having a thickness of 1 to 6 mm (=$X_1+X_2+Y$ (mm)), wherein:

- a distance (Z+Y (mm)) of the space in the molded article thickness direction is set to satisfy the following relationships when the substrates are placed in the cavity of the mold, when Y is in the range of 0.3≦Y<0.5 mm, {7.5−10Y} (mm)≦Z≦5.0 (mm), when Y is in the range of 0.5≦Y<2.0 mm, {3.0−Y} (mm)≦Z≦5.0 (mm), when Y is in the range of 2.0≦Y<3.0 mm, {2.0≦Y/2} (mm)≦Z≦5.0 (mm), and when Y is in the range of 3.0≦Y≦5.9 mm, {1.0≦Y/6}(mm)≦Z≦5.0 (mm), and

- the distance (Z+Y (mm)) of the space in the molded article thickness direction is decreased to Y (mm) while or as soon as the molten thermoplastic resin is injected into the space having the distance (Z+Y (mm)) in the molded article thickness direction.

The value of Z is required to be in the above-specified range depending upon each case of the thicknesses (Y) of the resin layer to be formed on the front surface of the substrate. When the value of Z is less than the above lower limit each case, the molten thermoplastic resin injected into the space exerts too high a shear stress on the substrate to cause damage to the pattern. When the value of Z is in the above range in each case, the shear stress of the molten thermoplastic resin injected into the space on the substrate is not so high as to cause damage to the pattern. When the value of Z exceeds the above upper limit in each case, air is liable to be entrapped in the interface between the front surface of the substrate and the resin layer, or a flow mark is liable to occur. The "flow mark" refers to a flow indication of the leading end of the resin. The flow mark arises when the leading end of the resin flowing in the cavity is cooled and moved by a following flow of molten resin.

The decreasing of the distance of the space in the molded article thickness direction to Y (mm) includes not only a case where the distance of the space is rigorously decreased to Y (mm) but also a case where the distance of the space is brought into the range of from 0.9Y to 1.1Y (mm). The thickness (Y) of the molded article can be sometimes nonuniform depending upon the profile of the molded article. In this case, the value of Z is determined on the basis of the minimum thickness of that portion of the resin layer which is in the range of within 20 mm from the gate portion of a mold. In other words, the above minimum thickness of the resin layer is taken as Y. In this case, any other portion of the resin layer, at least 20 mm apart from the gate portion of the mold, may have any thickness, since there is no damage to a pattern formed on the front surface of the substrate. That is because a molten thermoplastic resin which has flowed into the space at least 20 mm apart from the gate portion of the mold exerts only a small shear strength on the substrate.

The mold suitable for use in each of the processes of the present invention includes a mold having a cavity distance control means which is capable of adjusting the cavity distance in a molded article thickness direction and provided within the cavity (to be referred to as "mold A" hereinafter), and a mold having a telescopic structure and including a fixed mold member and a movable mold member (to be referred to as "mold B" hereinafter). In the mold B, the mold is adapted to an injection molding machine which has means for holding the movable mold member at any unclamped position in clamping the mold. The processes of the present invention will be explained hereinafter with regard to cases using the above two molds.

(A) Case where mold A is used:

FIG. 1 shows a schematic cross-sectional view of the mold A. The mold A comprises a fixed mold member 10 and a movable mold member 12. Numeral 20 indicates a cavity distance control means capable of adjusting the cavity distance in the molded article thickness direction, which means is provided in a cavity 14. For example, a substrate 30 is placed on the cavity distance control means 20. The front surface of the substrate 30 (surface on the left hand side in FIG. 1) is provided with a pattern (not shown). The surfaces (walls) 14A and 14B of the mold facing the cavity 14 are cavity walls. For adjusting the distance of a space 16 (surrounded by cavity walls 14A and 14B and the front surface of the substrate 30) in the molded article thickness direction (horizontal direction in FIG. 1), that is, for adjusting the distance between the front surface of the substrate 30 and the cavity wall 14A opposed to the front surface of the substrate 30, the cavity distance control means 20 is allowed to slide within the cavity 14. The cavity distance control means 20 comprises a metal plate for example. The cavity distance control means 20 is provided with a hydraulic cylinder 22 integrally assembled within the movable mold member 12. The position of the cavity distance control means 20 within the cavity 14 can be controlled with the hydraulic cylinder 22. In FIG. 1, numeral 18 indicates a gate portion. The means for controlling the position of the cavity distance control means 20 shall not be limited to a hydraulic cylinder alone, and it may have any suitable mechanism as required. Further, the cavity distance control means 20 may have any structure as required.

In the first aspect of the present invention, for example, the cavity distance control means 20 is arranged in a predetermined position within the cavity 14 under the control of the hydraulic cylinder 22. Then, a substrate having a pattern formed on the front surface thereof is placed in the cavity such that the reverse surface of the substrate is in contact with a cavity wall. Specifically, a substrate 30 comprising a thermoplastic resin material in the form of a film or a sheet and having a pattern formed on the front surface thereof is placed such that the reverse surface of the substrate 30 is in contact with a cavity wall (more exactly, in contact with the front surface of the cavity distance control means 20). In other words, the substrate 30 is placed in the cavity 14 such that its front surface including a pattern is exposed within the space 16. In this case, the distance (Z+Y (mm)) of the space 16 in the molded article thickness direction is set to satisfy the above-specified relationship depending upon the thickness (Y) of a resin layer. Then, the contact surfaces (parting) of the mold members are completely closed, which state is shown in FIG. 1. In FIG. 1, the substrate 30 is placed on the cavity distance control means 20.

Then, a molten thermoplastic resin 40 is injected into the space 16 having a distance (Z+Y) in the molded article thickness direction, as is shown in FIG. 2A. While the molten thermoplastic resin 40 is injected or as soon as the injection of the molten thermoplastic resin 40 is completed, the cavity distance control means 20 is allowed to slide within the cavity 14 to decrease the distance of the space 16 in the molded article thickness direction to Y (mm). In other words, the value of Z is reduced to zero, which state is shown in FIG. 2B.

While the molten thermoplastic resin 40 is injected or as soon as the injection of the molten thermoplastic resin 40 is completed, the cavity distance control means 20 is allowed to slide within the cavity 14 as described above, whereby there can be obtained a molded article having an excellent appearance and having a sealed pattern. When the distance of the space in the molded article thickness direction is decreased to Y after the molten thermoplastic resin has been injected into the cavity and starts to be cooled while contacting a cavity wall, the thermoplastic resin which already has started to cool is compressed, and as a result, a circular, flow mark-like defect called a press mark occurs on the resin layer surface, that is, the molded article has a defective appearance. In the second aspect of the present invention, a first substrate and a second substrate are placed in the cavity 14 such that the reverse surface of each of the substrates is in contact with a cavity wall as will be explained later. In this case, the cooling rate of the molten thermoplastic resin 40 injected into the space 16 can be decreased owing to the heat insulation effect of these two substrates, and the occurrence of a press mark therefore can be prevented.

(B) Case where mold B is used:

In the method for the production of a molded article having a surface including a sealed pattern, provided by the present invention, there may be used a special injection molding machine equipped with an injection compression mechanism (an injection molding machine capable of injecting a molten resin while a mold is not completely closed). FIG. 3 shows a schematic cross-sectional view of the mold B. The mold B comprises a fixed mold member 10 and a movable mold member 12, and has a telescopic structure. If the mold B has no telescopic structure, a molten thermoplastic resin 40 injected into a cavity 14 may leak from the cavity 14 to be entrapped in the contact surface (parting) of the fixed mold member 10 and the movable mold member 12, which may damage the mold.

In the first aspect of the present invention, the substrate 30 comprising a thermoplastic resin material in the form of a film or a sheet and having a pattern formed on its front surface is placed on the movable mold member 12. In the second aspect of the present invention, a substrate 30 is placed on the fixed mold member 10 and another substrate 30 is placed on the movable mold member 12. In the latter case, any one of the front surface of the substrate 30 placed on the fixed mold member 10 or the front surface of the substrate 30 placed on the movable mold member 12 may include a pattern. In the first and second aspects of the present invention, the substrate 30 or the substrates 30 are placed such that the reverse surface of each substrate 30 is in contact with a cavity wall. Then, the mold is clamped. In this case, the movable mold member 12 is held in a position where the mold is not completely clamped, which state is shown in FIG. 3. In FIG. 3, the substrate 30 is placed on a cavity wall 14C of the movable mold member 12. The distance (Z+Y (mm)) of a space 16 in the molded article thickness direction is set to satisfy the above-specified relationship, depending upon the thickness (Y) of a resin layer, by adjusting the position of the movable mold member 12 as described above.

Then, a molten thermoplastic resin 40 is injected into the space 16 having a distance (Z+Y (mm)) in the molded article thickness direction, as is shown in FIG. 4A. While the molten thermoplastic resin 40 is injected or as soon as the injection of the molten thermoplastic resin 40 is completed, the movable mold member 12 is allowed to slide toward the fixed mold member 10 to decrease the distance of the space 16 in the molded article thickness direction to Y (mm). In other words, the value of Z is reduced to zero, which state is shown in FIG. 4B.

In the processes for the production of a molded article having a surface including a sealed pattern, the resin forming the substrate in the form of a sheet or a film and the resin for forming the resin layer are not especially limited, while it is necessary to select these resins so that the substrate and the resin for the resin layer can be mutually fused or melt-integrated. Specifically, when the thermoplastic resin forming the substrate is polycarbonate (to be sometimes referred to as "PC" hereinafter), the resin for the resin layer may be selected from PC, a PC composition, a PC-containing alloy and a composition containing any one of these and an inorganic or organic filler. When the thermoplastic resin forming the substrate is polymethyl methacrylate (PMMA), the resin for the resin layer may be selected from PMMA, a methyl methacrylate-styrene copolymer (MS) and a acrylonitrile-styrene copolymer (AS). When the thermoplastic resin forming the substrate is high-impact polystyrene (HIPS), the resin for the resin layer may be selected from HIPS, AS, general-purpose polystyrene and MS. When the thermoplastic resin forming the substrate is polyamide (PA), the resin for the resin layer may be PA. In the present invention, when the resin forming the substrate and the resin for the resin layer have the same resin composition, an integrated molded article can be easily produced, and further, a high adhesion strength between the substrate and the resin layer can be obtained even when the resin forming the substrate and the resin for the resin layer contain various additives. It is therefore preferred to constitute the substrate and the resin layer from the same resin composition.

The substrate in the form of a film or a sheet is preferably selected from transparent or semi-transparent materials. In the second aspect of the present invention, at least one of the substrates is required to be transparent or semi-transparent. When the material(s) for the substrate(s) are selected as described above, the pattern formed on the front surface of the substrate by a printing method, a hot stamping method or a thin film forming method can be seen through the reverse surface of the substrate (outer surface of the molded article). When the pattern is formed on the front surface of the substrate by a printing method using an ink, the substrate is preferably formed of a thermoplastic resin having a glass transition temperature equal to, or higher than, the temperature for baking the ink.

In the first aspect of the present invention, the thickness (X) of the substrate is preferably 0.1 to 1 mm. In the second aspect of the present invention, the thickness ($X_1$ or $X_2$) of each of the substrates is preferably 0.1 to 1 mm. When the reverse surface of the substrate is coated with a hard coat layer, a heat insulating layer, a non-fogging layer, an anti-reflection layer or a photochromic layer, the thickness (X or $X_1+X_2$) of the substrate includes the thickness of any one of these layers. When the substrate has the above thickness, it is excellent in the formability of the pattern on the front surface, cutting properties, attaching properties to a mold, and the like. When the substrate has a thickness of less than 0.1 mm, the substrate may undergo creasing or wrinkling when the resin layer is formed. When the substrate has a thickness of more than 1 mm, it is difficult to cut it to a desired size, shape and form before placing it in the cavity of the mold. Further, in the first aspect of the present invention, the thickness (X) of the substrate is preferably ½ or less than ½ of the thickness (=X+Y) of a molded article. In the second aspect of the present invention, the total thickness ($X_1+X_2$) of the substrates is preferably ½ or less than ½ of the thickness (=$X_1+X_2+Y$) of a molded article. When the thickness (X or $X_1+X_2$) of the substrate is greater than ½ of the above thickness (X+Y or $X_1+X_2+Y$), the adhesion between the substrate and the resin layer may be defective, since the thickness of the resin layer (Y) decreases. When the resin layer has a thickness (Y) of 0.2 mm or less, particularly, the adhesion between the substrate and the resin layer is liable to be defective. When the thickness (X+Y or $X_1+X_2+Y$) of the molded article is less than 2 mm, the thickness (X or $X_1+X_2$) of the substrate may be more than ½ of the thickness (X+Y or $X_1+X_2+Y$) of the molded article in some cases.

The pattern can be formed on the front surface of the substrate by a printing method, a hot stamping method or a thin film forming method. In the printing method, an ink is selected from generally used inks such as a thermoplastic ink and a UV-curable ink. The temperature for baking the ink may be a temperature suitable for baking an ink which is employed. The ink is preferably selected from those inks which exhibit an adhesion strength of at least 0.7 kg/cm between the substrate surface and the ink when tested by an adhesion test using a cellophane tape, and which contain no solvents which deteriorate the substrate and crack the substrate. In the hot stamping method, the pattern is formed on the front surface of the substrate by pressing a foil such as a metal foil, a coloring foil or a deposition foil on the front surface of the substrate by means of a hot die. In the thin film forming method, for example, the pattern is formed by depositing a metal on the front surface of the substrate. The thin film forming method includes (A) various vacuum deposition methods such as an electron beam heating method, a resistance heating method and a flash vapor deposition method, (B) a plasma deposition method, (C) various sputtering methods such as a dipole sputtering method, a direct current sputtering method, a high-frequency sputtering method, a magnetron sputtering method, an ion beam sputtering method and a bias sputtering method, (D) various ion plating methods such as a DC (direct current) method, an RF method, a multi-cathode method, an activated reaction method, an HCD (hollow cathode discharge) method, an electric field deposition method, a high-frequency ion-plating method and a reactive ion plating method, and (E) a CVD (chemical vapor deposition) method. Further, a plating method may be used to form a pattern on the substrate surface.

The outer surface of the molded article (e.g., the reverse surface of the substrate) has an exposed surface of a plastic, and its surface hardness is hence low. Therefore, the outer surface of the molded article is generally provided with a hard coating to prevent scratching or damage. In this conventional hard coating treatment, the molded article is cleaned and then subjected to a heat treatment called an annealing treatment to moderate an internal stress which has occurred within the molded article at the molding process. When no annealing treatment is carried out, particularly when the molded article is a product formed of an amorphous resin, the molded article may undergo cracking due to a solvent contained in the hard coating solution. After the annealing treatment, the hard coating solution is applied to the outer surface of the molded article to form a hard coating, and then the applied hard coating solution is heat treated or exposed to ultraviolet light to cure the hard coating solution. When the molded article has an uneven surface or a dent portion, hard coating solution stands stagnant in the dent portion, and the molded article provided with a hard coating is liable to have a defective surface.

In the processes for the production of a molded article, provided by the present invention, the substrate(s) can be formed of a thermoplastic resin material in the form of a flat film or sheet. Therefore, the internal stress of the molded article is considerably smaller than that of a molded article with a sealed pattern obtained by a conventional method. As a result, the annealing treatment is not necessary, and the hard coating solution can be directly applied to the molded article without an annealing treatment. Further, the hard coating solution rarely stands stagnant. In the processes of the present invention, a masking film or the like is applied to the front surface of the substrate, and the hard coating is then formed on the reverse surface (where no pattern is formed) of the substrate by a known hard coating method such as a dipping method, a spray method or a flow coater method. Thereafter, the resin layer is formed on the front surface (including the pattern) of the substrate, whereby the molded article having a front surface including the sealed pattern can be easily obtained. The material for the hard coating is selected from a silicone resin, a polysiloxane resin, an acrylic resin and a urethane resin.

In place of, or together with, the hard coating, the reverse surface of the substrate may be provided with a heat insulating layer, a non-fogging layer, an anti-reflection layer or a photochromic layer. In the present invention, all these layers are sometimes generically referred to as a functional layer.

The heat insulating layer can be formed, for example, by the method disclosed in JP-A-60-253519. For example, the heat insulating layer can be formed by any one of a method in which a film of a (meth)acrylate-based copolymer containing a heat insulating agent is heat-laminated on the reverse surface of the substrate of PC when the substrate is produced, a method in which a coating composition of a (meth)acrylate-based copolymer containing a heat insulating agent is applied to the reverse surface of the substrate by a wire bar method, etc., and dried under heat, and a method in which a thin film of Au or Cu is formed by a vacuum deposition method.

The non-fogging layer can be formed, for example, by the method disclosed in JP-A-60-250927. For example, the non-fogging layer can be formed by any one of a method in which a film of a (meth)acrylate-based copolymer containing a non-fogging agent is heat-laminated on the reverse surface of the substrate of PC when the substrate is produced, a method in which a coating composition of a (meth)acrylate-based copolymer containing a non-fogging agent or a solvent-containing, heat-curable coating composition of polyvinyl alcohol or an amino resin is applied to the reverse surface of the substrate by a wire bar method, etc., and dried under heat.

The anti-reflection layer can be formed, for example, by the method disclosed in JP-A-60-253518. For example, the anti-reflection layer can be formed by a method in which the substrate is passed through hot rolls having an uneven surface when it is produced from PC by a T-die method or by a method in which an anti-reflection coating composition is applied to the reverse surface of the substrate by a wire bar method, etc., and dried under heat.

The photochromic layer can be produced, for example, by the method disclosed in JP-A-61-5910. For example, the photochromic layer can be produced by a method in which a film of a synthetic resin containing a photochromic agent is heat-laminated or bonded to the reverse surface of the substrate of PC when the substrate is produced, or by a method in which an acrylate copolymer-based coating composition containing a photochromic agent is applied to the reverse surface of the substrate by a wire bar method, etc., and dried under heat.

When the hard coating or the functional layer is formed by applying a coating composition, the front surface of the substrate where the pattern is formed is covered with a masking film, and the coating composition having the above function can be applied to the reverse surface with no pattern thereon, and cured. Alternatively, the coating composition having the above function is coated on the reverse surface of the substrate and cured to form the hard coating or the functional layer, then, a masking film is attached to the hard coating or the functional layer, and a pattern can be formed on the front surface of the substrate. The hard coating and the functional layer can be formed of materials suitable for the performance required of the molded article.

The substrate can be positioned in the cavity of the mold, for example, by a method in which the thermoplastic resin material in the form of a film or a sheet is stamped with a press machine having a Thomson blade of which the form is the same as, or similar to, the form of the cavity, thereby to prepare the substrate having a predetermined form, and then the stamped substrate is positioned in the cavity. The substrate can be reliably positioned in the cavity by a method in which the mold is provided with pin(s) in the cavity, the substrate is provided with a tab portion having hole(s), and the hole(s) of the tab portion are fitted to the pin(s) of the mold.

The substrate can be also reliably positioned in the cavity by another method in which a piece of iron having a thickness of about 0.2 mm with an adhesive is preliminarily attached to the tab portion of the substrate, a magnet is embedded in a mold cavity portion corresponding to the tab portion, and the substrate is positioned under the attraction force of the magnet to the piece of iron. This method is disclosed in JP-A-1-99822.

Specifically, for example, the marginal portion of the cavity wall 14C or the cavity distance control means 20 is provided with at least one concave portion (not shown) having a length of at least 5 mm, a width of at least 5 mm and a depth of at least 0.1 mm. A pin having a diameter of at least 1 mm is provided in the nearly central portion of the concave portion, or a magnet is embedded in the concave portion. Further, the substrate is provided with a tab portion whose form is suited to the form of the concave portion, and a round, square or oval hole corresponding to a cross-section of the pin is made in the tab portion. Otherwise, a piece of iron having a thickness of about 0.2 mm with an adhesive is attached to the tab portion. The so-formed tab portion is engaged in the concave portion, whereby the substrate can be easily positioned in the cavity. Further, the pin and the magnet can be used in combination, whereby the accuracy of positioning of the substrate and the feeding of the substrate into the cavity can be improved.

In the first aspect of the present invention, one substrate is placed in the cavity, and in the second aspect of the present invention, two substrates are placed in the cavity. In the latter case, the gate portion 18 should be changed to a position so as to be opened in the cavity wall 14B.

When one substrate is placed in the cavity, i.e., in the process for the production of a molded article according to the first aspect of the present invention, the space is formed by the cavity walls 14A and 14B and the front surface of one substrate 30. When the molded article produced is cut in the molded article thickness direction, the cross section includes, as schematically shown in FIG. 5, a resin layer 34, a substrate 30 having a front surface including a pattern 32, and optionally a hard coating or functional layer 36 (the hard coating or the functional layer is sometimes simply referred to as a functional layer hereinafter), which is formed on the reverse surface of the substrate 30. When the molded article has the functional layer 36, the thickness (X) of the substrate and the thickness (X+Y) of the molded article include the thickness of the functional layer 36.

When two substrates are placed in the cavity, i.e., in the process for the production of a molded article according to the second aspect of the present invention, the space is formed by the cavity walls 14B and the front surfaces of these two mutually opposing substrates (first and second substrates). When the molded article produced is cut in the molded article thickness direction, the cross section includes, as schematically shown in FIG. 6, a functional layer 36A, which is formed on the reverse surface of a first substrate 30A as required, the first substrate 30A having a front surface including a pattern 32A, a resin layer 34, a second substrate 30B having a front surface including a pattern 32B, and a functional layer 36B, which is formed on the reverse surface of the second substrate 30B as required. No pattern may be formed on the front surface of the first substrate 30A or the second substrate 30B. In this structure, the outer surfaces of the molded article can have the functional layers, and as a result, the molded article can exhibit further improved performance. In this case, the thickness (X) of the substrate corresponds to the total of the thickness ($X_1$) of the first substrate 30A and the thickness ($X_2$) of the second substrate 30B. The thickness of the molded article corresponds to the total of the thickness of the first substrate 30A, the thickness of the second substrate 30B and the thickness of the resin layer 34. Further, when the functional layers 36A and 36B are formed, the thickness ($X_1$, $X_2$) of the substrate and the thickness ($X_1+X_2+Y$) of the molded article also include the thickness of each of the functional layers 36A and 36B.

In the process for the production of a molded article according to the second aspect of the present invention, the constitutions of the first and second substrates and the constitution of the resin layer can be arranged as follows. For the purpose of explanation, it is assumed that the front surface (front side) of the molded article is constituted by the first substrate and that the reverse surface (back side) of the molded article is constituted by the second substrate.

(1) When the molded article is formed of transparent or semi-transparent first and second substrates and a transparent resin layer:
  (a) A pattern is formed on the front surface of the first substrate.
  (b) A functional layer is formed on the reverse surface of the first substrate as required.
  (c) A pattern is formed on the front surface of the second substrate as required.
  (d) A functional layer is formed on the reverse surface of the second substrate as required.

(2) When the molded article is formed of transparent or semi-transparent first and second substrates and an opaque resin layer containing, e.g., a glass filler:
  (a) A pattern is formed on the front surface of the first substrate.
  (b) A functional layer is formed on the reverse surface of the first substrate as required.
  (c) A pattern is formed on the front surface of the second substrate as required.
  (d) A functional layer is formed on the reverse surface of the second substrate as required.

(3) When the molded article is formed of a transparent or semi-transparent first substrate, an opaque second substrate and a transparent or semi-transparent resin layer:

11

(a) A pattern is formed on the front surface of the first substrate.

(b) A functional layer is formed on the reverse surface of the first substrate as required.

(c) A pattern or a functional layer is formed on the reverse surface of the second substrate as required.

For producing a molded article having a great curvature or a high draw ratio, desirably, the substrate is preliminarily shaped into a predetermined form by a vacuum forming method for imparting the substrate with the form similar to the form of a mold cavity. When the form of the shaped substrate is not very complicated, a pattern can be formed on the front surface of the shaped substrate. When the form of the shaped substrate is complicated, it is difficult to form a pattern on the front surface of the shaped substrate. In this case, a pattern is formed on the front surface of the substrate in the form of a flat film or sheet before the substrate is shaped, and the heat shrinkage factor of the substrate and the change of the substrate in the form, under the influence of the shaping, are taken into consideration for positioning the pattern on the front surface of the substrate. After the pattern is formed, the substrate can be imparted with a predetermined form by a vacuum forming method.

The injection rate (linear velocity) of the molten thermoplastic resin is preferably 100 mm/second or less. When the injection rate is in the above range, the shear stress of the molten thermoplastic resin to the substrate can be decreased, and the damage to the pattern can be effectively prevented. Further, it is preferred to adjust the molding conditions such that a pressure in the range of from 200 to 400 kgf/cm$^2$ is exerted on the cavity wall after the distance of the space in the molded article thickness direction is decreased to Y (mm).

In the processes for the production of a molded article according to the first and second aspects of the present invention, the molten thermoplastic resin is injected into the space having a distance (Z+Y) in the molded article thickness direction which is greater than the distance (Y) of a space which is to define the thickness of the molded article as a product. The injection in this manner can decrease the influence of shear stress of the molten thermoplastic resin on that portion of the substrate which is located near the gate portion. As a result, the damage to the pattern included in the molded article can be effectively prevented, and no particular treatment of the front surface of the substrate is required for preventing the damage to the pattern.

BRIEF DESCRIPTION OF THE DRAWINGS

The present invention will be explained hereinafter with reference to drawings and Examples.

12

DESCRIPTION OF THE PREFERRED EMBODIMENTS

EXAMPLE 1

Figure 1:
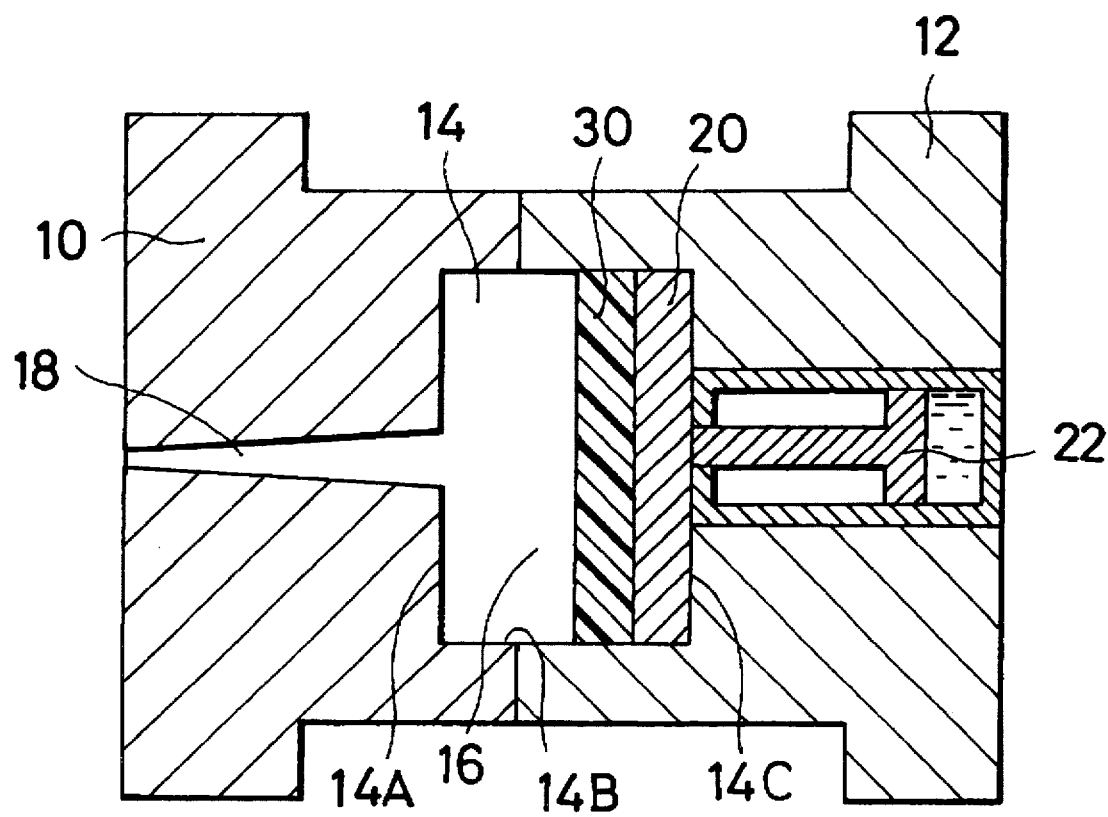
FIG. 1 is a schematic cross-sectional view of mold A.

The same mold as the mold A shown in FIG. 1 was used in Example 1. The mold had a cavity 14 having a size of 100 mm×100 mm. The distance of the space 16 in the molded article thickness direction (this distance corresponded to the thickness of a molded article) was 3 mm. The space 16 is surrounded by the cavity walls 14A and 14B and the cavity distance control means 20. Three concave portions (not shown) having a length of 10 mm, a width of 10 mm and a depth of 0.5 mm each were formed in marginal portions of the cavity distance control means 20, and a magnet was embedded in each concave portion.

Figure 5:
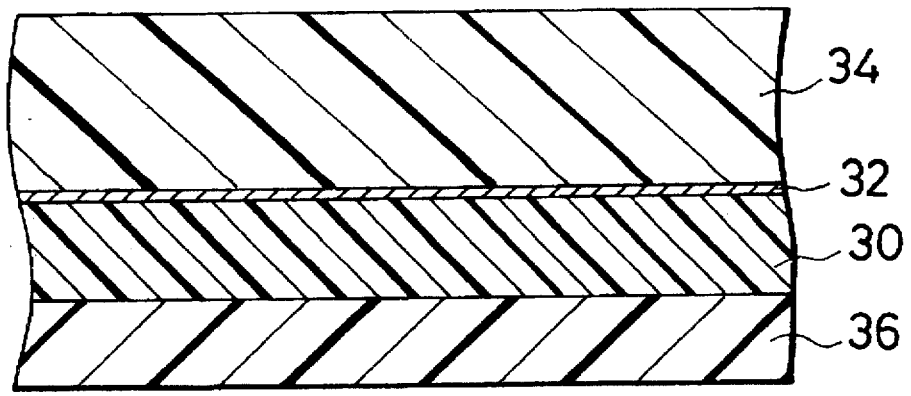
FIG. 5 is a schematic cross-sectional view of a molded article.
Figure 6:
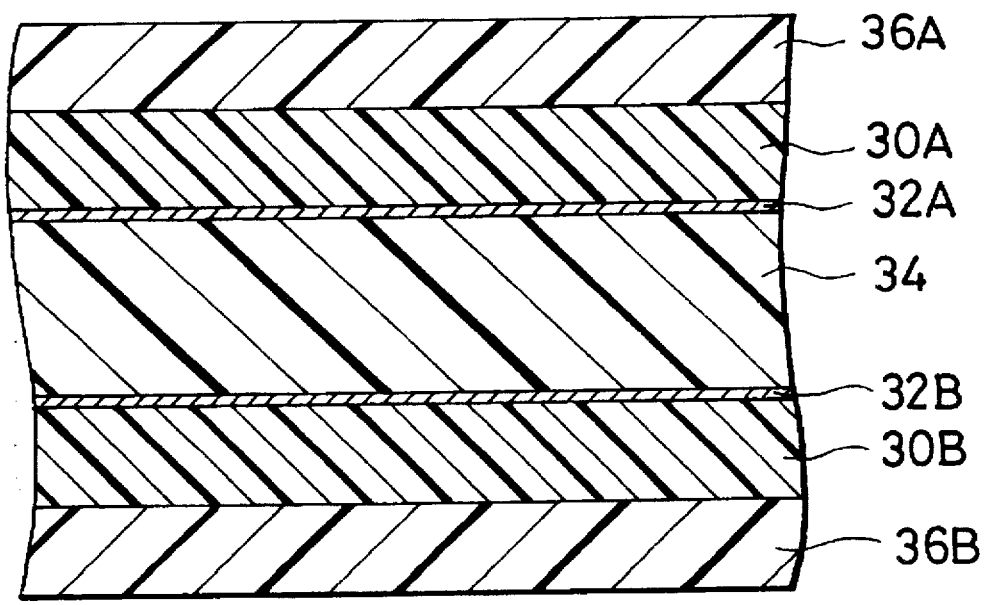
FIG. 6 is a schematic cross-sectional view of another molded article.
Figure 7:
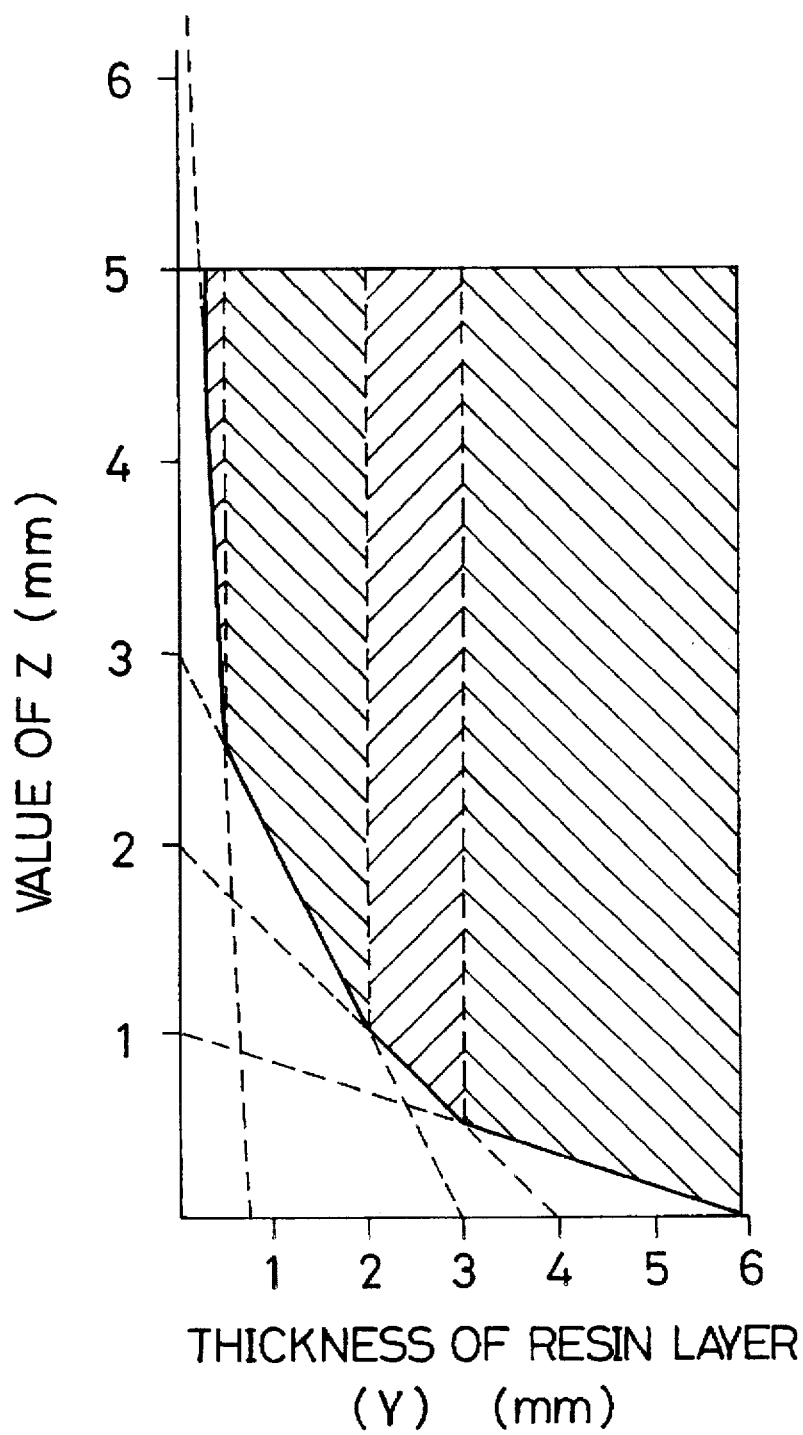
FIG. 7 is a graph showing the relationship between the thickness (Y) of a resin layer and part (Z) of the distance of a space.

A molded article having a cross section as shown in FIG. 5 was produced in Example 1, in which the thickness (X) of the substrate 30 was 0.5 mm, and the thickness (Y) of the resin layer 34 was set at 2.5 mm. That is, the thickness (=X+Y) of a molded article was set at 3.0 mm. In this Example, no functional layer was formed.

In the beginning, the hydraulic cylinder 22 was actuated to adjust the position of the cavity distance control means 20 in the cavity 14 to set the distance (Z+Y) of the space 16 formed by the cavity walls 14A and 14B and the front surface of the substrate 30 at 3.5 mm. That is, Z was set at 1.0 mm. In other words, the distance between the front surface of the substrate 30 and the cavity wall 14A opposed to the front surface of the substrate 30 was set at 3.5 mm.

A pattern of a printing ink (trade name: HR, supplied by Jujo Kako Kabushiki Kaisha) was screen-printed on the surface of the substrate 30 formed of a 0.5 mm thick polycarbonate sheet (trade name: Iupilon sheet NF2000, supplied by Mitsubishi Gas Chemical Company, Inc.), and the ink was baked in a drying furnace at 100° C. for 1 hour. Then, the substrate was cut to the form (including the form of the concave portions) of the cavity with a press machine, and pieces of iron having a thickness of 0.2 mm with a double coated adhesive tape were attached to those portions of the substrate which corresponded to the concave portions.

Then, the substrate 30 was placed in the cavity 14 of the mold (specifically, on the cavity distance control means 20) under the attraction force of the magnets embedded in the concave portions to the pieces of irons, whereby there was formed the space 16 surrounded by the cavity walls 14A and 14B and the front surface of the substrate 30.

Then, the mold was completely closed (see FIG. 1). In this state, the distance (Z+Y) of the space 16 formed by the cavity walls 14A and 14B and the front surface of the substrate 30 in the molded article thickness direction was 3.5 mm, i.e., Z=1.0 mm.

Figure 2A:
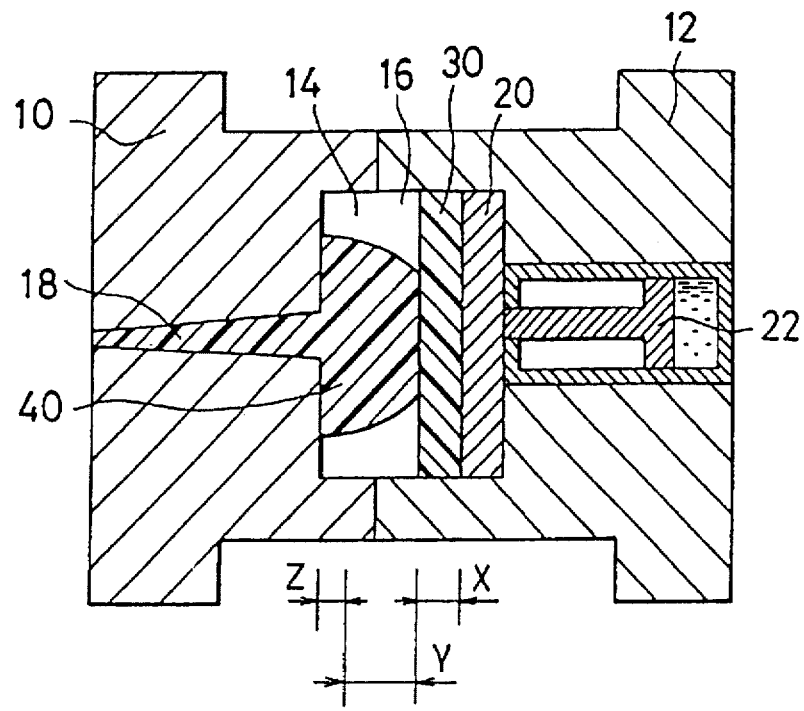
FIGS. 2A and 2B are schematic cross-sectional views of mold A, etc., for the explanation of steps of producing a molded article in Example 1 using the mold A.

Then, a polycarbonate resin (trade name: Iupilon H-3000, supplied by Mitsubishi Gas Chemical Company, Inc.) as a thermoplastic resin was injected into the space 16 under the following conditions (see FIG. 2A).

| Resin temperature | 280° C. |
| Mold temperature | 60° C. |
| Injection pressure (gage pressure) | 700 kgf/cm$^2$ |
| Injection rate | 80 mm/second |

Figure 2B:
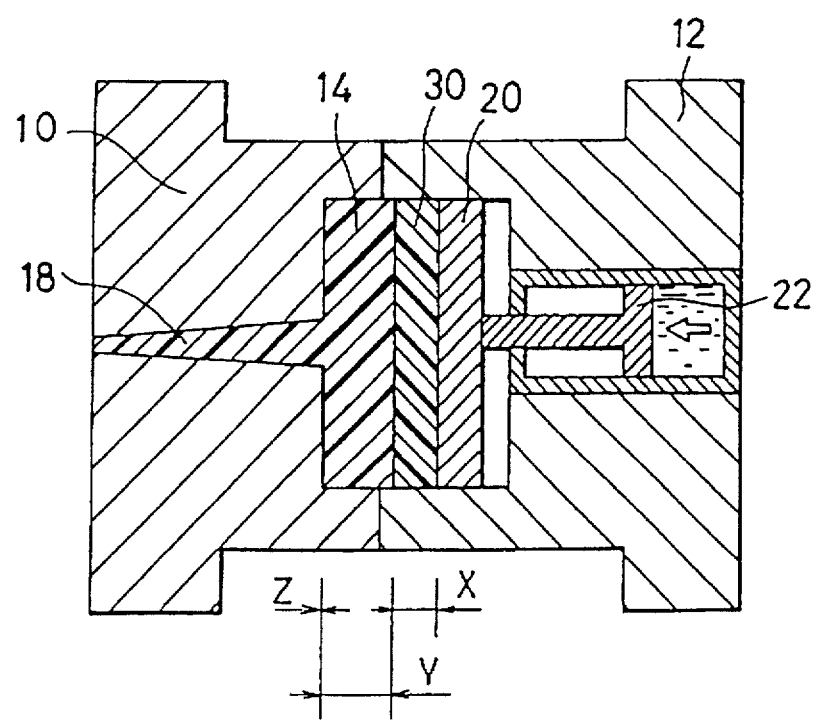

As soon as the injection of the molten thermoplastic resin was completed, the cavity distance control means 20 was moved 1 mm toward the fixed mold member 10 by actuating the hydraulic cylinder 22 (see FIG. 2B). In other words, the cavity distance control means 20 was allowed to slide within the cavity 14 for decreasing the distance of the space 16 in the molded article thickness direction to accomplish Y=2.5 (mm). In this case, the surface pressure in the cavity wall was 400 kgf/cm². After the so-formed resin layer was allowed to cool, the molded article was taken out of the mold. The molded article had the same cross section as shown in FIG. 5 (except for a functional layer) and had a thickness of 3 mm. The substrate 30 and the resin layer 34 were completely integrated under heat and pressure at the molding process. In the molded article, no damage to the pattern by the flow or displacement of the ink was observed on the molded article surface including those portions of the molded article surface which corresponded to the vicinity of the gate portion 18.

EXAMPLE 2

Molded articles were produced in the same manner as in Example 1 except that the thickness (X) of the substrate 30, the thickness (Y) of the resin layer 34 and the distance (Z+Y) of the space 16 in the molded article thickness direction were set at various values as shown below (unit: mm). In all the molded articles, the substrate 30 and the resin layer 34 were completely integrated under heat and pressure at the molding process. In these molded articles, no damage to the pattern was observed on the molded article surface including those portions of the molded article surface which corresponded to the vicinity of the gate portion 18.

| Thickness of substrate (X) | Thickness of resin layer (Y) | Thickness of molded article (X + Y) | Distance of space (Z) |
| --- | --- | --- | --- |
| 0.1 | 0.9 | 1.0 | 3.2 |
| 0.3 | 1.2 | 1.5 | 2.2 |
| 0.5 | 1.5 | 2.0 | 2.0 |
| 0.5 | 3.5 | 4.0 | 1.0 |
| 1.0 | 5.0 | 6.0 | 0.6 |

COMPARATIVE EXAMPLE 1

Molded articles having various thicknesses (X+Y) shown below were produced in the same manner as in Example 1 except that the values of Z were set at less than the lower limit values and that the values of X and Y were set as shown below. In these molded articles, ink flows occurred in those portions of the molded article surfaces which corresponded to the vicinity of the gate portion 18 due to the influence of shear stress in the molten thermoplastic resin, and all the molded articles had defective appearances.

| Thickness of substrate (X) | Thickness of resin layer (Y) | Thickness of molded article (X + Y) | Distance of space (Z) |
| --- | --- | --- | --- |
| 0.5 | 0.5 | 1.0 | 2.0 |
| 0.7 | 0.8 | 1.5 | 1.0 |
| 1.0 | 1.0 | 2.0 | 0.8 |
| 0.5 | 3.5 | 4.0 | 0.2 |
| 1.0 | 5.0 | 6.0 | 0 |

EXAMPLE 3

Figure 3:
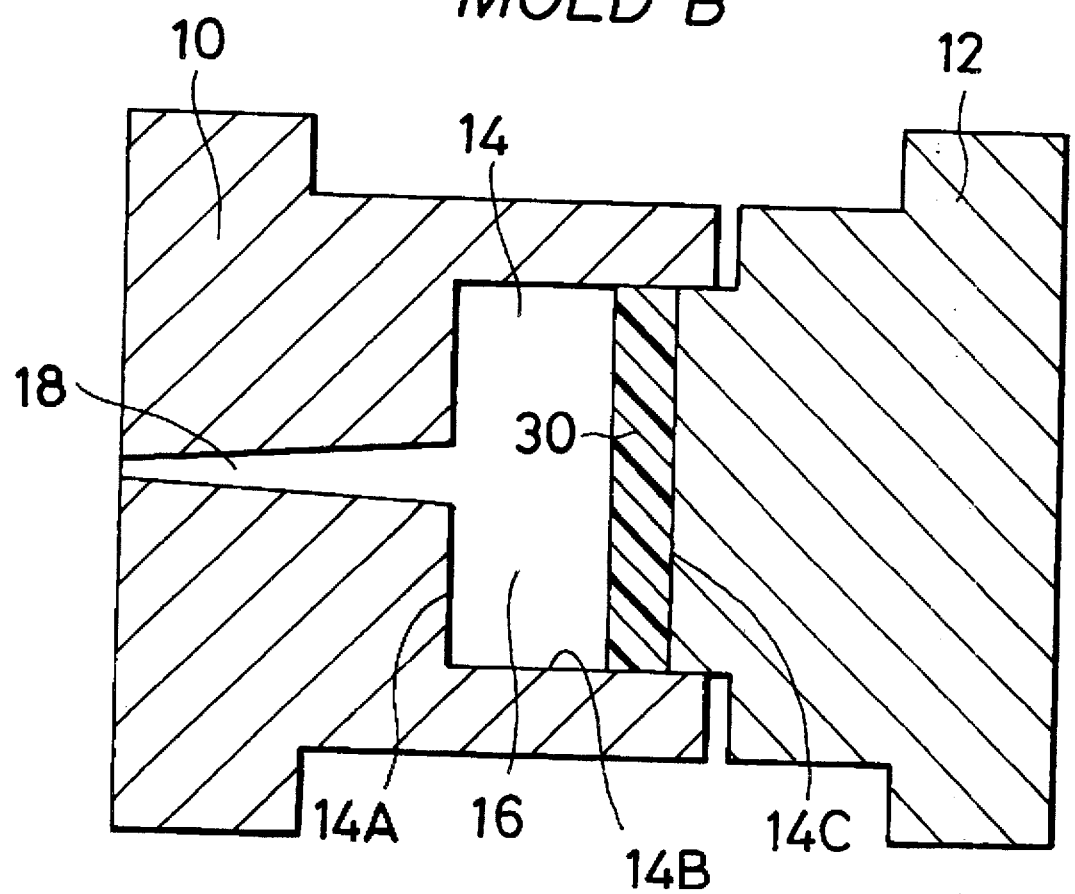
FIG. 3 is a schematic cross-sectional view of mold B.

The same mold as the mold B shown in FIG. 3 was used in Example 3. The mold had a cavity 14 having a size of 100 mm×100 mm. The distance of the space 16 surrounded by the cavity walls 14A, 14B and 14C in the molded article thickness direction was 3 mm. In other words, the distance between the cavity wall 14A and the cavity wall 14C was 3 mm. Concave portions (not shown) were formed in marginal portions of the cavity wall 14C in the same manner as in Example 1, and a magnet was embedded in each concave portion. The mold B had a telescopic structure so that no molten resin leaked from the cavity when the parting of the mold was opened.

A molded article having a cross section as shown in FIG. 5 was produced in Example 3, in which the thickness (X) of the substrate 30 was 0.5 mm, and the thickness (Y) of the resin layer 34 was set at 2.5 mm. That is, the thickness (=X+Y) of the molded article was set at 3.0 mm. A hard coating was formed on the reverse surface of the substrate 30.

A pattern of a printing ink material having a UV curable acrylic resin as a main component (trade name: CELICALL UV-PAL, supplied by Teikoku Ink Kabushiki Kaisha) was screen-printed on the front surface of the substrate 30 formed of a 0.5 mm thick polycarbonate sheet (trade name: Iupilon sheet MROX, supplied by Mitsubishi Gas Chemical Company, Inc.), and the ink was ultraviolet light-cured by exposing the pattern to two 80 W/cm mercury lamps positioned at a distance of 15 cm from the front surface of the substrate, and under a condition of a belt speed of 10 m/min. Then, the substrate was cut to the form of the cavity (including the form of the concave portions) with a press machine, and pieces of iron having a thickness of 0.2 mm with a double coated adhesive tape were attached to those portions of the substrate which corresponded to the concave portions.

Then, the substrate 30 was placed in the cavity 14 of the mold (specifically, on the cavity wall 14C formed by the movable mold member 12) under the attraction force of the magnets embedded in the concave portions to the pieces of irons.

The mold was closed in a state where the parting distance between the movable mold member 12 and the fixed mold member 10 was 1.0 mm (see FIG. 3). That is, the distance (Z+Y) of the space 16 formed by the cavity walls 14A and 14B and the front surface of the substrate 30 was set at 3.5 mm (Z=1.0 mm).

Figure 4A:
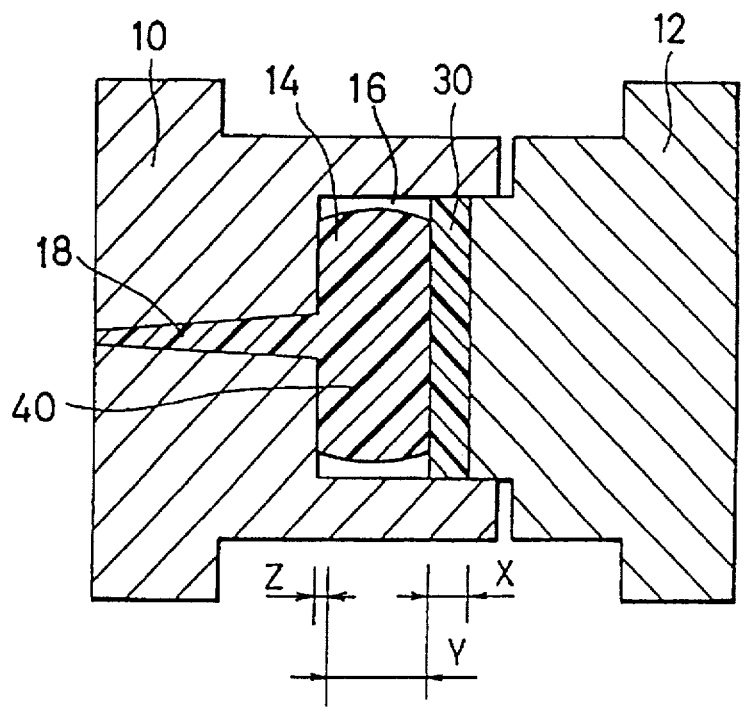
FIGS. 4A and 4B are schematic cross-sectional views of mold B, etc., for the explanation of steps of producing a molded article in Example 3 using the mold B.

Then, a polycarbonate resin (trade name: Iupilon S-3000, supplied by Mitsubishi Gas Chemical Company, Inc.) as a thermoplastic resin was injected into the space 16 under the following conditions (see FIG. 4A).

| | |
| --- | --- |
| Resin temperature | 290° C. |
| Mold temperature | 60° C. |
| Injection pressure (gage pressure) | 500 kgf/cm² |
| Injection rate | 50 mm/second |

Figure 4B:
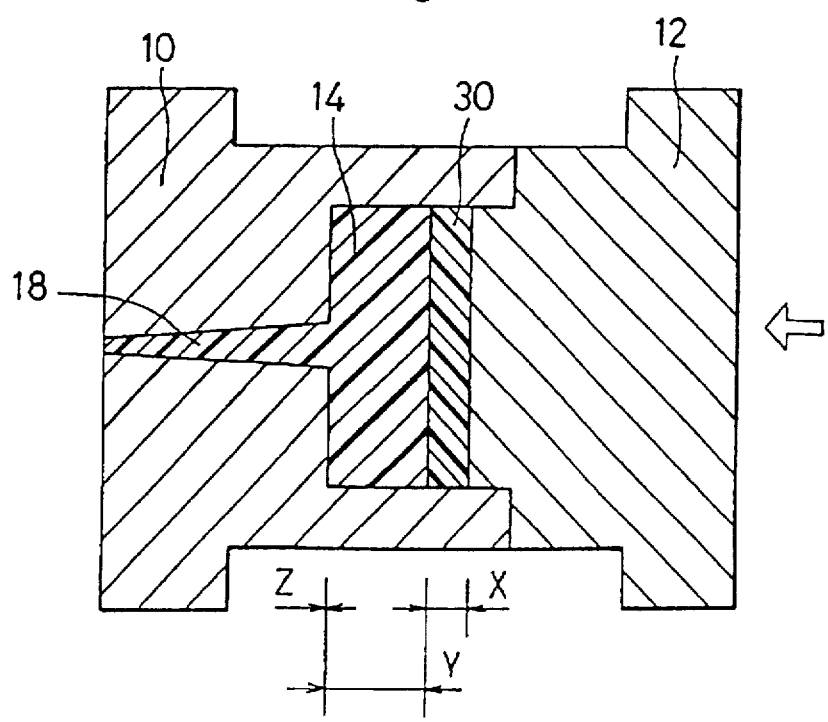

As soon as the injection of the molten thermoplastic resin was completed, the movable mold member 12 was allowed to slide 1 mm toward the fixed mold member 10 to clamp the mold until the parting of the mold was completely closed, whereby the distance of the space 16 in the molded article thickness direction was set at Y=2.5 mm (see FIG. 4B). After the resin layer was allowed to cool, the molded article was taken out of the mold. The molded article had a structure shown in FIG. 5 and had a thickness of 3 mm. The substrate 30 and the resin layer 34 were completely integrated under heat and pressure at the molding process. In the molded article, no damage to the pattern by the flow or displacement of the ink was observed on the molded article surface including those portions of the molded article surface which corresponded to the vicinity of the gate portion 18.

According to the processes of the production of a molded article with a sealed pattern, provided by the present invention, the damage to the pattern under the shear stress of the molten thermoplastic resin can be effectively prevented. Further, when a functional layer is formed on the reverse surface of the substrate in advance as required, it is no longer necessary to form a functional layer on the molded article by a post treatment, and the process for the production of the molded article can be hence simplified. No special pretreatment of the front surface of the substrate is necessary for preventing the damage to the pattern. Moreover, the molten thermoplastic resin flows in a broader space than in prior art processes, and it can therefore flow much more smoothly than in prior art processes. As a result, molded articles having an excellent quality and having a small thickness can be produced, or a thermoplastic resin having a lower flowability can be used.

What is claimed is:

1. A process for the production of a molded article having a surface including a sealed pattern by an injection compression molding method, which comprises placing a substrate having a thickness of X mm comprising a thermoplastic resin material in the form of a film or a sheet and having a pattern on the front surface thereof in a cavity of a mold with the reverse surface of the substrate in contact with a cavity wall of the mold, injecting a molten thermoplastic resin into a space surrounded by cavity walls and the front surface of the substrate, with a linear velocity of the molten thermoplastic resin of 100 mm/second or less, and thereby forming a resin layer of the thermoplastic resin having a thickness of Y mm on the front surface of the substrate to form a molded article having the pattern sealed with the resin layer and having a thickness, X+Y :mm, of 1 to 6 mm, wherein:

a distance of the space in the molded article thickness direction is set to satisfy the following relationships before and at the time of initiation of injecting the molten thermoplastic resin into the space, when Y is in the range of $0.3 \leq Y < 0.5$ mm, $\{7.5-10Y\}$mm$\leq Z \leq 5.0$ mm, when Y is in the range of $0.5 \leq Y < 2.0$ mm, $\{3.0-Y\}$mm$\leq Z \leq 5.0$ mm, when Y is in the range of $2.0 \leq Y < 3.0$ mm, $\{2.0-Y/2\}$mm$\leq Z \leq 5.0$ mm, and when Y is in the range of $3.0 \leq Y < 5.9$ mm, $\{1.0-Y/6\}$mm$\leq Z \leq 5.0$ mm, wherein the distance of the space is represented by Z+Y mm, and Z means a distance of an additional space in the space in the molded article thickness direction in mm, and the distance of the space in the molded article thickness direction is decreased to the thickness of the resin layer, Y mm, during or immediately after the molten thermoplastic resin is injected into the space having the distance of Z+Y mm in the molded article thickness direction.

2. The process according to claim 1, wherein a mold provided with cavity distance control means for controlling a cavity distance in the molded article thickness direction is used, and the cavity distance control means is allowed to slide in the cavity for decreasing the distance of the space in the molded article thickness direction to the thickness of the resin layer, Y mm.

3. The process according to claim 1, wherein a mold comprising a fixed mold member and a movable mold member is used, and the movable mold member is allowed to slide toward the fixed mold member for decreasing the distance of the space in the molded article thickness direction to the thickness of the resin layer, Y mm.

4. The process according to claim 1, wherein a substrate having a thickness of 0.1 to 1 mm is used, and the thickness of the substrate is ½, or less than ½, of the thickness of the molded article.

5. The process according to claim 1, wherein the pattern is formed on a front surface of the substrate by a printing method, a hot stamping method or a thin film forming method.

6. The process according to claim 1, wherein a substrate having a reverse surface provided with a hard coating, a heat insulating layer, a non-fogging layer or an anti-reflection layer is used as the substrate.

7. The process according to claim 1, wherein a transparent or semi-transparent substrate is used as the substrate.

8. A process for the production of a molded article having a surface including a sealed pattern by an injection compression molding method, which comprises placing a first substrate having a thickness of $X_1$ mm comprising a thermoplastic resin material in the form of a film or a sheet and having a pattern on the front surface thereof and a second substrate having a thickness of $X_2$ mm in a cavity of a mold so that the reverse surface of each substrate is in contact with a cavity wall of the mold and that each front surface of these two substrates is opposed to each other, injecting a molten thermoplastic resin into a space surrounded by cavity walls and the front surfaces of the substrates with a linear velocity of the molten thermoplastic resin of 100 mm/second or less, and thereby forming a resin layer of the thermoplastic resin having a thickness of Y mm in a gap between the front surface of the first substrate and the front surface of the second substrate to form a molded article having the pattern sealed with the resin layer and having a thickness, $X_1+X_2+Y$ mm, of 1 to 6 mm, wherein:

a distance of the space in the molded article thickness direction is set to satisfy the following relationships before and at the time of initiation of injecting the molten thermoplastic resin into the space, when Y is in the range of $0.3 \leq Y < 0.5$ mm, $\{7.5-10Y\}$mm$\leq Z \leq 5.0$ mm, when Y is in the range of $0.5 \leq Y < 2.0$ mm, $\{3.0-Y\}$mm$\leq Z \leq 5.0$ mm, when Y is in the range of $2.0 \leq Y < 3.0$ mm, $\{2.0-Y/2\}$mm$\leq Z \leq 5.0$ mm, and when Y is in the range of $3.0 \leq Y < 5.9$ mm, $\{1.0-Y/6\}$mm$\leq Z \leq 5.0$ mm, wherein the distance of the space is represented by Z+Y mm, and Z means a distance of an additional space in the space in the molded article thickness direction in mm, and the distance of the space in the molded article thickness direction is decreased to the thickness of the resin layer, Y mm, during or immediately after the molten thermoplastic resin is injected into the space having the distance of Z+Y mm in the molded article thickness direction.

9. The process according to claim 8, wherein a mold provided with cavity distance control means for controlling a cavity distance in the molded article thickness direction is used, and the cavity distance control means is allowed to slide in the cavity for decreasing the distance of the space in the molded article thickness direction to the thickness of the resin layer, Y mm.

10. The process according to claim 8, wherein a mold comprising a fixed mold member and a movable mold member is used, and the movable mold member is allowed to slide toward the fixed mold member for decreasing the distance of the space in the molded article thickness direction to the thickness of the resin layer, Y mm.

11. The process according to claim 8, wherein substrates having a thickness $X_1$ or $X_2$ mm, of 0.1 to 1 mm are used as the substrates, and the total thickness of the substrates is ½, or less than ½, of the thickness, $X_1+X_2+Y$ mm, of the molded article.

12. The process according to claim 8, wherein the pattern is formed on a front surface of the substrate by a printing method, a hot stamping method or a thin film forming method.

13. The process according to claim 8, wherein a substrate having a reverse surface provided with a hard coating, a heat insulating layer, a non-fogging layer or an anti-reflection layer is used as one of the substrates.

14. The process according to claim 8, wherein a transparent or semi-transparent substrate is used as one of the substrates.

* * * * *